United States Patent
Lai

(10) Patent No.: US 8,491,748 B1
(45) Date of Patent: Jul. 23, 2013

(54) GLUING METHOD FOR ASSEMBLING OPTICAL TRANSCEIVER MODULE

(75) Inventor: Chih-Chen Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/544,022

(22) Filed: Jul. 9, 2012

(30) Foreign Application Priority Data

Apr. 13, 2012 (TW) .............................. 101113129 A

(51) Int. Cl.
*C23C 16/52* (2006.01)

(52) U.S. Cl.
USPC ............. 156/293; 156/74; 156/578; 359/811; 359/642; 359/819; 427/8; 427/240

(58) Field of Classification Search
USPC .......... 156/74, 578, 293; 427/8, 240; 359/811
See application file for complete search history.

(56) References Cited

U.S. PATENT DOCUMENTS

| 2008/0063784 A1* | 3/2008 | Yuan | 427/8 |
| 2008/0093390 A1* | 4/2008 | Yu | 222/330 |
| 2008/0105710 A1* | 5/2008 | Yu | 222/160 |

* cited by examiner

*Primary Examiner* — Jeff Aftergut
*Assistant Examiner* — Jaeyun Lee
(74) *Attorney, Agent, or Firm* — Altis Law Group, Inc.

(57) ABSTRACT

Provided is a gluing method for assembling an optical transceiver module. In the gluing method, a substrate, a lens and a lens barrel are provided. The lens barrel is mounted on the substrate and includes a top surface and an inner surface. The lens includes an upper surface. A rotatable platform is provided to hold the substrate. The lens is positioned in the lens barrel, with the upper surface being lower than the top surface relative to the substrate. A gluing syringe containing glue is positioned above the upper surface. The gluing syringe is moved toward the lens such that a syringe needle of the gluing syringe is closer to the substrate and is yet spaced from the upper surface. The syringe needle is then moved to contact the inner surface. The rotatable platform is rotated and the glue is output to glue the lens to the inner surface.

12 Claims, 4 Drawing Sheets

GLUING METHOD FOR ASSEMBLING OPTICAL TRANSCEIVER MODULE

BACKGROUND

1. Technical Field

The present disclosure relates to optical transceiver modules and, particularly, to a gluing method for assembling an optical transceiver module.

2. Description of Related Art

A typical optical transceiver module includes a lens barrel and a lens received in the lens barrel. The lens includes a top surface, a side surface adhering to an inner surface of the lens barrel, and a plurality of micro-lenses protruding from the top surface. Each micro-lens is coupled with a photoelectric converter. The top surface aligns with an end surface of the lens barrel. Glue is dropped into a gap between the side surface of the lens and the inner surface of the lens barrel to combine the lens and the lens barrel. However, the glue may spatter onto the micro lenses, which can influence the optical properties of the micro-lenses.

Therefore, it is desirable to provide a gluing method, which can overcome the limitations described above.

DETAILED DESCRIPTION

Figure 1:
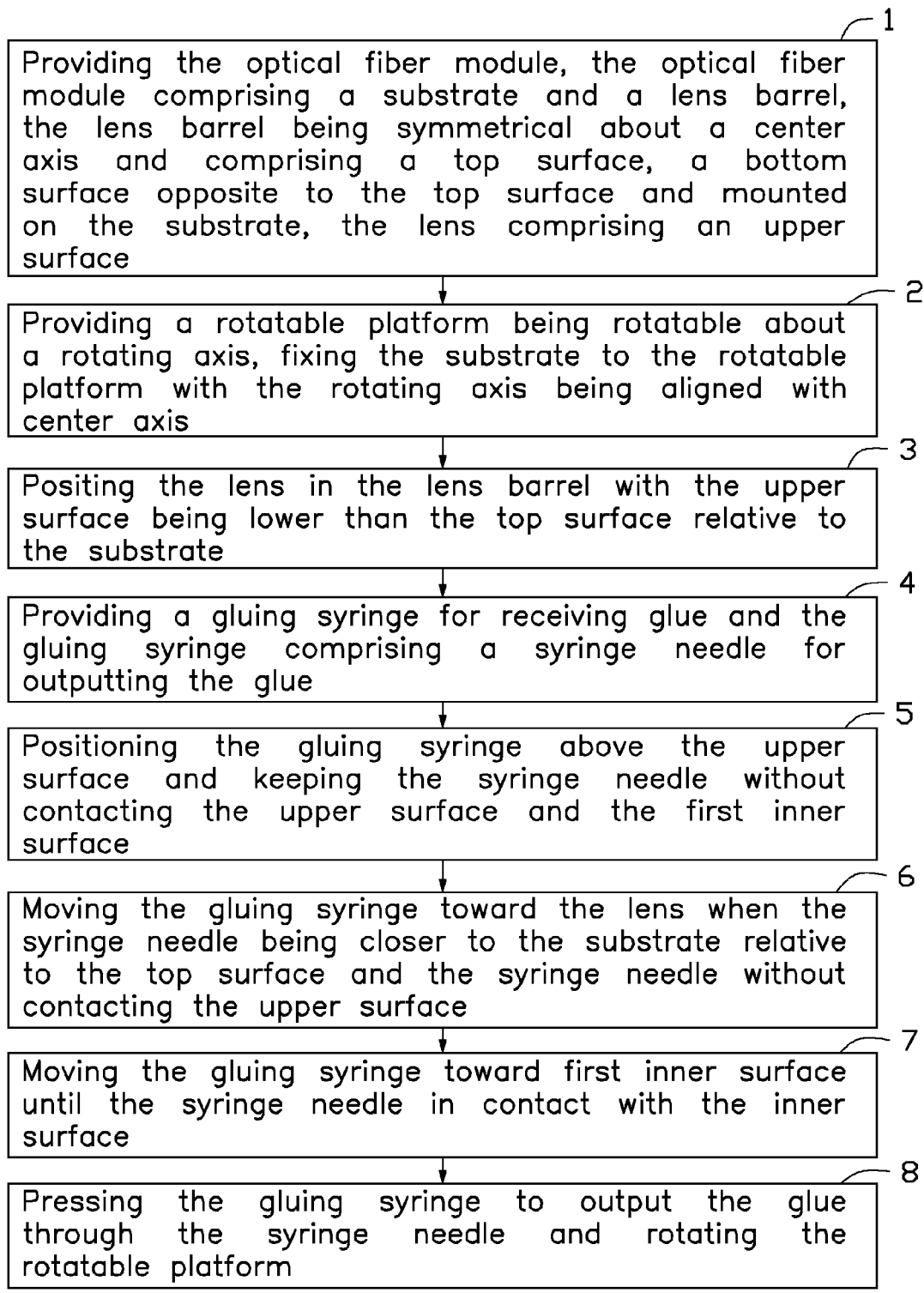
FIG. 1 is a flow chart of a gluing method for assembling an optical transceiver module, according to an exemplary embodiment.
Figure 2:
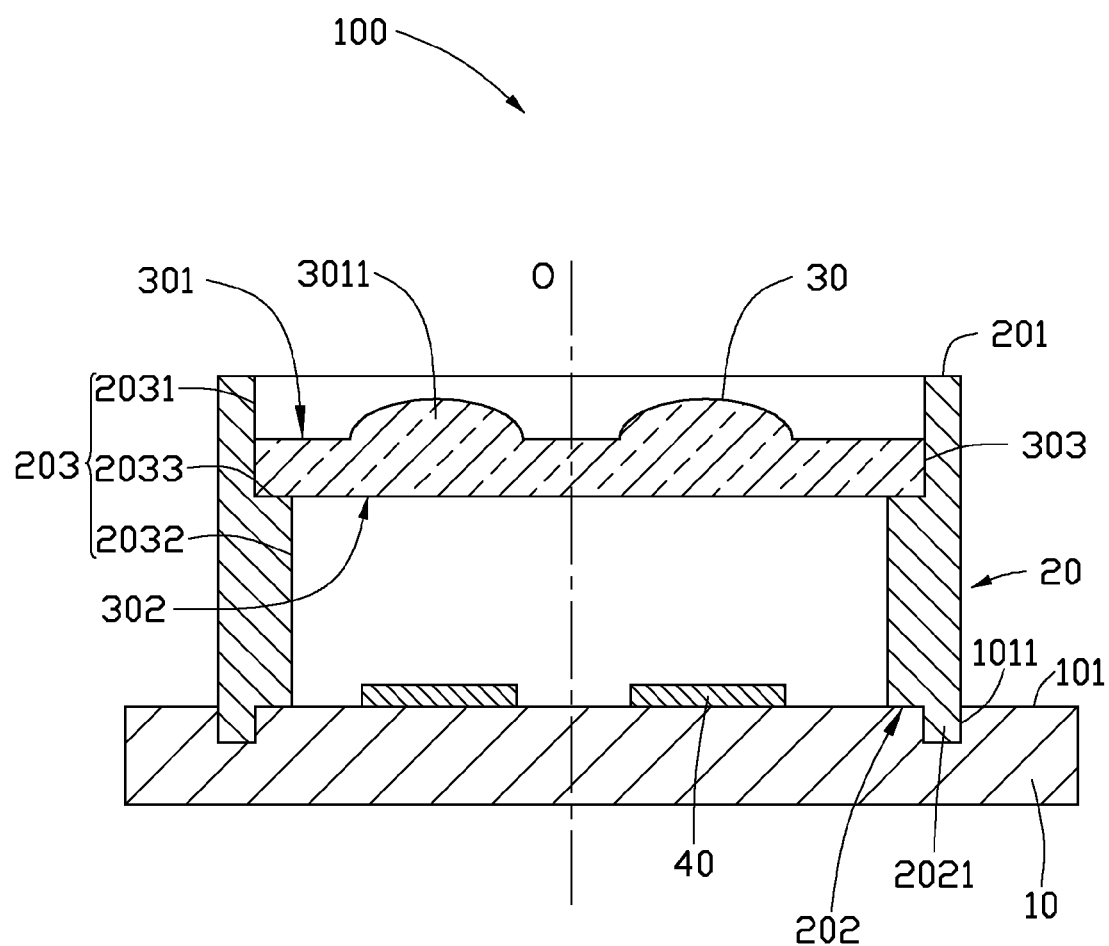
FIG. 2 is a schematic view of the gluing method of FIG. 1, which is in a first stage.

FIGS. 1 to 4 illustrate a gluing method for assembling an optical transceiver module, in accordance with an exemplary embodiment. The gluing method includes the following steps:

Referring to FIGS. 1 and 2, in step S1, providing an optical transceiver module 100 which can receive/transmit optical signals from/to other photoelectric devices. The optical transceiver module 100 includes a substrate 10, a lens barrel 20, a lens 30, and a plurality of photoelectric converters 40.

The substrate 10 is a printed circuit board (PCB) and includes a mounting surface 101.

The lens barrel 20 is tubular and substantially symmetrical about a center axis O. The lens barrel 20 includes a top surface 201, a bottom surface 202 opposite to the top surface 201, and a stepped cylindrical inner surface 203 connected between the top surface 201 and the bottom surface 202. The bottom surface 202 adheres to the mounting surface 101. The top surface 201 is parallel to and away from the mounting surface 101. In this embodiment, the lens barrel 20 further includes a protruding portion 2021 extending up from the bottom surface 202. The substrate 10 defines a receiving groove 1011 on the mounting surface 101 corresponding to the protruding portion 2021. The protruding portion 2021 is received and fixed in the receiving groove 1011 by adhesive, as such the lens barrel 20 is steadily mounted on the substrate 10.

The inner surface 203 includes a cylindrical first inner surface 2031, a cylindrical second inner surface 2032, and an annular connection surface 2033. The first inner surface 2031 and the second inner surface 2032 are parallel to the center axis O. The first inner surface 2031 substantially perpendicularly connects to the top surface 201. The connection surface 2033 perpendicularly connects to the first inner surface 2031 and the second inner surface 2302. A distance from the center axis O to the first inner surface 2031 is greater than a distance from the center axis O to the second inner surface 2032.

The lens 30 is made of plastic or glass and in plan view is circular. The lens 30 includes an upper surface 301, a lower surface 302 opposite to the upper surface 301, and a side surface 303 perpendicularly connecting the upper surface 301 and the lower surface 302. The upper surface 301 and the lower surface 302 are substantially perpendicular to the center axis O. A radius of the lens 30 corresponds to the distance from the center axis O to the first inner surface 2031. The lens 30 also includes a plurality of micro-lenses 3011 extending up from the upper surface 301.

The photoelectric converters 40 are mounted on the mounting surface 101, electrically connected to the substrate 10, and are received in the lens barrel 20. A photo diode (PD) and a laser diode (LD) are integrated into each photoelectric converter 40. The PD converts optical signals to electrical signals and the LD converts electrical signals to optical signals. Each photoelectric converter 40 is optically aligned with a micro-lens 3011.

Figure 3:
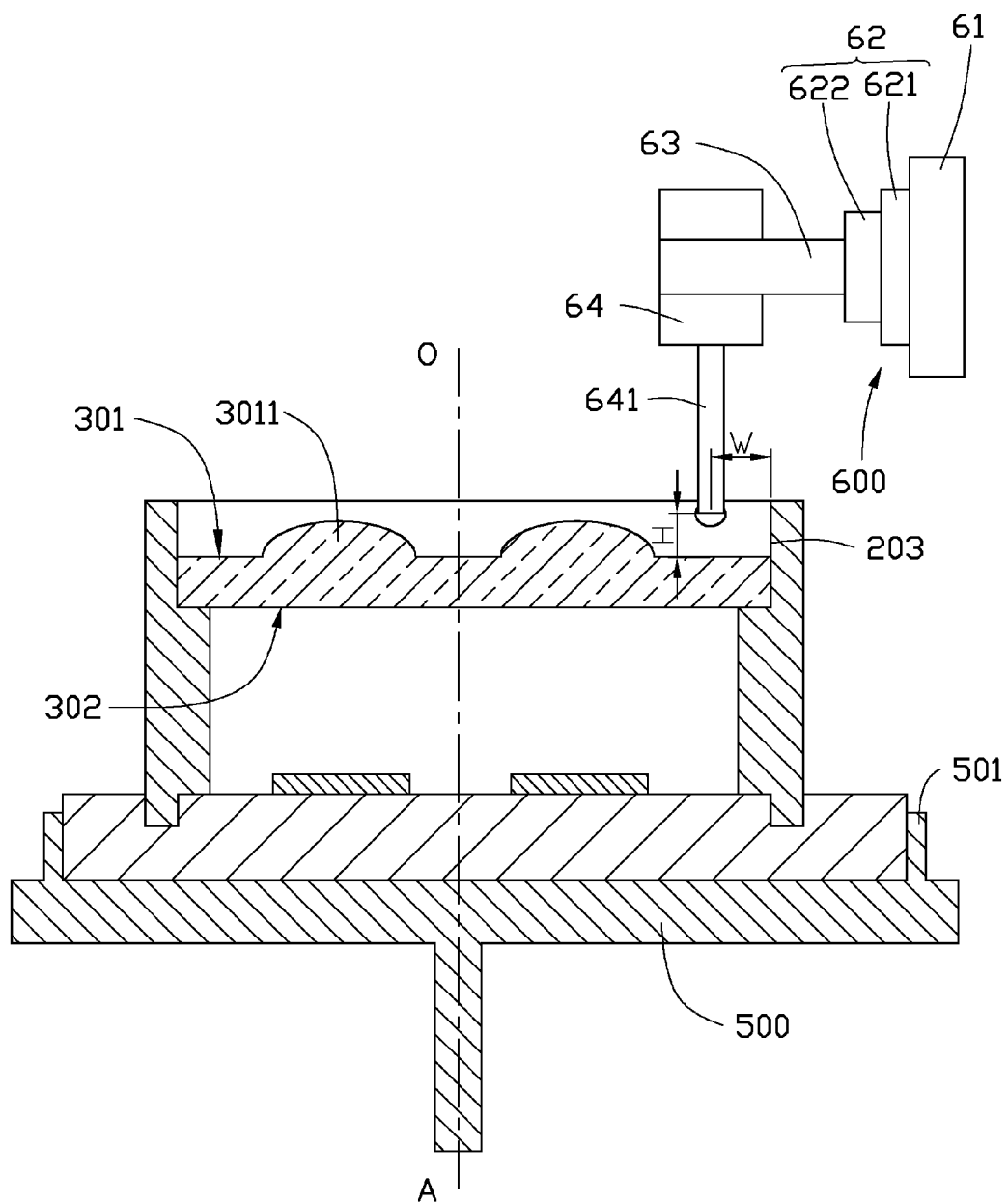
FIG. 3 is a schematic view of the gluing method of FIG. 1, which is in a second stage.

Referring to FIGS. 1 and 3, in step S2, providing a rotatable platform 500 which can be rotated about a rotating axis A. The rotatable platform 500 includes a plurality of clamping arms 501. The substrate 10 with the photoelectric converters 40 and the lens barrel 20 mounted on the mounting surface 101 is fixed to the rotatable platform 500. The clamping arms 501 clamp the substrate 10. The center axis O is coaxial with the rotating axis A.

In step S3, positioning the lens 30 in the lens barrel 20 with the lower surface 302 attaching to the connection surface 2033 and the side surface 303 attaching to the first inner surface 2031. The upper surface 301 is lower than the top surface 201 relative to the substrate 10. In one embodiment, a distance to from the upper surface 301 to the top surface 201 is about 1 centimeter.

In step S4, providing a gluing device 600. The gluing device 600 includes a base 61, a motor group 62, a clamping member 63, and a gluing syringe 64. The motor group 62 includes a first stepper motor 621 connected to the base 61 and a second stepper motor 622 connected to the first stepper motor 621. The clamping member 63 is connected to the second stepper motor 622. The first stepper motor 621 drives the second motor 622 and the clamping member 63 to move along a direction substantially parallel to the center axis O. The second stepper motor 622 drives the clamping member 63 to move along a direction substantially perpendicular to the center axis O. The gluing syringe 64 contains glue and is clamped by the clamping member 63. The gluing syringe 64 includes a syringe needle 641 for outputting the glue.

In step S5, positioning the gluing syringe 64 above the upper surface 301 with the syringe needle 641 spaced from the upper surface 301 and the first inner surface 2031. In this step, by controlling the first stepper motor 621 and the second stepper motor 622 to drive the clamping member 63 move along the directions parallel to and perpendicular to the center axis O to precisely position the gluing syringe 64. A distance between the syringe needle 641 and the upper surface 301 is H and a distance between the syringe needle 641 and the first inner surface 2031 is W. In one embodiment, H is about 0.8 centimeters and W is also about 0.8 centimeters.

Figure 4:
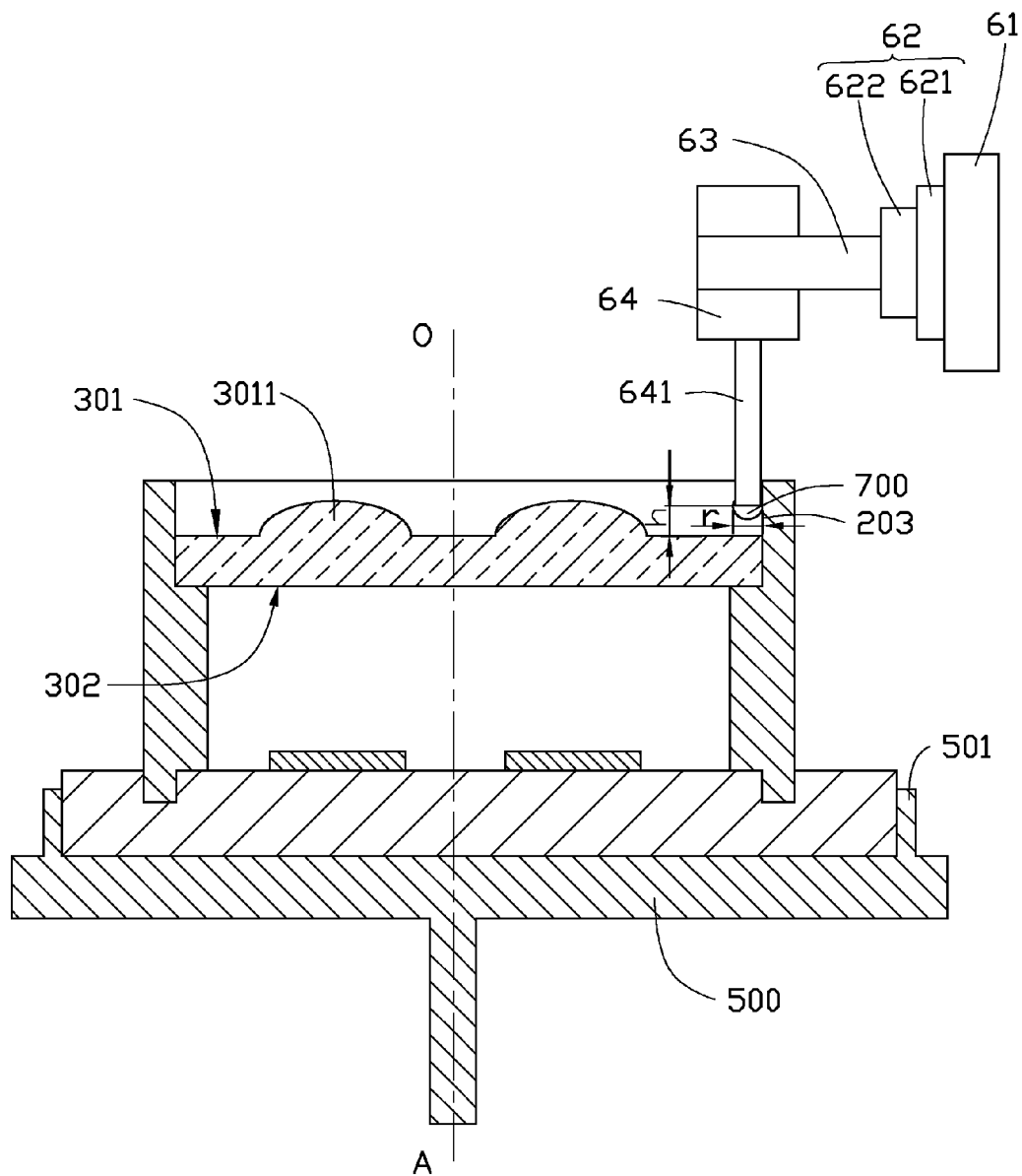
FIG. 4 is a schematic view of the gluing method of FIG. 1, which is in a third stage.

Referring to FIGS. 1 and 4, in step S6, moving the gluing syringe 64 toward the lens 30, such that the syringe needle 641 is closer to the substrate 10 relative to the top surface 201 and the syringe needle 641 is yet spaced from the upper surface 301. In this step, by controlling the first stepper motor 621 to drive the clamping member 63 move along the direction parallel to the center axis O to moving the gluing syringe 64 toward the lens 30. A distance between the syringe needle 641 and the upper surface 301 is h. In one embodiment, h is about 0.3 centimeters, which is greater than an average radius r of a single drop of the glue.

In step S7, moving the gluing syringe 64 toward the first inner surface 2031 until the syringe needle 641 is in contact with the inner surface 2031. In this step, by controlling the second stepper motor 621 to drive the clamping member 63 move along the direction perpendicular to the center axis O to moving the gluing syringe 64 toward the inner surface 2031.

In step S8, pressing the gluing syringe 64 to output the glue through the syringe needle 641 and rotating the rotatable platform 500. The glue flows onto the first inner surface 2031 and then flows along the first inner surface 2031 into a slit formed between the side surface 303 and the first inner surface 2031. The glue can be continuously dispensed and infill the whole circumferential length of the slit by rotating the rotatable platform 500.

In the embodiment, the syringe needle 641 contacts the first inner surface 2031 and the glue flows into the slit along the first inner surface 2031, this avoids glue spatters onto the micro-lenses 3011.

In alternative embodiments, the lens 30 can be square and the first inner surface 2031 is also square. In this case, by rotating the platform 500 as in step S8 and further controlling the first motor 621 and the second motor 622 to move the gluing syringe 64 backwards and forwards, the syringe needle 641 can be kept in contact with the first inner surface 2031.

In alternative embodiments, the bottom surface 302 can be other than perpendicular to the center axis O, if the orientation of the connection surface 2033, to which the bottom surface 302 is attached, to the center axis O is other than perpendicular.

In alternative embodiments, the inner surface 203 can be cylindrical, and the lens 30 is an interference fit in the lens barrel 20 before glue is applied.

While various embodiments have been described, it is to be understood that the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A gluing method for assembling an optical transceiver module, comprising:
   (1): providing a substrate, a lens and a lens barrel, the lens barrel being symmetrical about a center axis and comprising a top surface, a bottom surface, and an inner surface, the bottom surface opposite to the top surface and mounted on the substrate, the lens comprising an upper surface;
   (2): providing a rotatable platform to hold the substrate, the rotatable platform having a rotating axis, the rotating axis being coaxial with center axis;
   (3): positioning the lens in the lens barrel, with the upper surface being lower than the top surface relative to the substrate;
   (4): providing a gluing syringe containing glue, the gluing syringe comprising a syringe needle for outputting the glue;
   (5): positioning the gluing syringe above the upper surface and keeping the syringe needle without contacting the upper surface and the inner surface;
   (6): moving the gluing syringe toward the lens such that the syringe needle being closer to the substrate relative to the top surface and the syringe needle yet without contacting the upper surface;
   (7): moving the gluing syringe toward the inner surface until the syringe needle in contact with the inner surface;
   (8): pressing the gluing syringe to output the glue through the syringe needle and rotating the rotatable platform.

2. The gluing method of claim 1, wherein the rotatable platform comprises a plurality of clamping arms for clamping the substrate.

3. The gluing method of claim 1, wherein the gluing syringe is clamped by a clamping member, the clamping member is connected to a motor group, the motor group comprises a first stepper motor for driving the clamping member to move along a direction parallel to the center axis and a second stepper motor for driving the clamping member to move along a direction perpendicular to the center axis.

4. The gluing method of claim 3, wherein in step (5), the gluing syringe is positioned by controlling the first stepper motor to drive the clamping member to move along a direction parallel to the center axis and by controlling the second stepper motor to drive the clamping member to move along another direction perpendicular to the center axis.

5. The gluing method of claim 3, wherein in step (6), the gluing syringe is moved toward the lens by controlling the first stepper motor to drive the clamping member to move along the direction parallel to the center axis.

6. The gluing method of claim 3, wherein in step (7), the gluing syringe is moved toward the inner surface by controlling the second stepper motor to drive the clamping member to move along the direction perpendicular to the center axis.

7. The gluing method of claim 1, wherein the inner surface is stepped and comprises a cylindrical first inner surface, a cylindrical second inner surface, and an annular connection surface, the first inner surface and the second inner surface are parallel to the center axis, the connection surface connects to the first inner surface and the second inner surface, a distance from the center axis to the first inner surface is greater than a distance from the center axis to the second inner surface; the lens is circular and further comprises a lower surface opposite to the top surface and a side surface connected between the top surface and the lower surface, a radius of the lens corresponds to the distance from the center axis to the first inner surface; the low surface attaches to the connection surface and the side surface attaches to the first inner surface when the lens is positioned in the lens barrel.

8. The gluing method of claim 7, wherein the connection surface and the low surface are perpendicular to the center axis.

9. The gluing method of claim 1, wherein the lens comprises a plurality of micro-lenses protruding from the upper surface; in step (1), a plurality of photoelectric converters is provided and mounted on the substrate and received in the lens barrel, each photoelectric converter is optically aligned with a respective one of the micro-lenses.

10. The gluing method of claim 1, wherein the substrate is a printed circuit board.

11. The gluing method of claim 1, wherein a distance from the top surface to the upper surface is about 1 centimeter when the lens is positioned in the lens barrel.

12. The gluing method of claim 1, wherein the inner surface is cylindrical and the lens is interference fit in the lens barrel.

\* \* \* \* \*